(12) United States Patent
Mandelcorn

(10) Patent No.: US 6,438,008 B1
(45) Date of Patent: Aug. 20, 2002

(54) TRANSIENT CURRENT SUPPRESSION CIRCUITRY FOR REDUCING NOISE OF BATTERY FLOATING ACROSS INPUT OF VOLTAGE POLARITY SWITCH

(76) Inventor: Yehoshua Mandelcorn, 5515 Williamstown Rd., Dallas, TX (US) 75230

( * ) Notice: Subject to any disclaimer, the term of this patent is extended or adjusted under 35 U.S.C. 154(b) by 877 days.

(21) Appl. No.: 08/902,290

(22) Filed: Jul. 29, 1997

Related U.S. Application Data

(63) Continuation of application No. 08/572,941, filed on Dec. 15, 1995, now abandoned.

(51) Int. Cl.[7] .............................................. H02M 7/06
(52) U.S. Cl. ..................................................... 363/126
(58) Field of Search ................................ 363/123, 125, 363/126; 307/44–46, 66; 320/39, 48, 57, 59

(56) References Cited

U.S. PATENT DOCUMENTS

| | | | | |
|---|---|---|---|---|
| 3,646,366 A | * | 2/1972 | McNamee | 307/252 W |
| 3,708,701 A | * | 1/1973 | Kawada | 310/8.1 |
| 3,959,707 A | * | 5/1976 | Stephens | 320/39 |
| 4,136,382 A | * | 1/1979 | Ricci | 363/137 |
| 4,441,066 A | * | 4/1984 | Burmenko | 320/48 |
| 4,775,800 A | * | 10/1988 | Wood | 307/46 |
| 5,131,376 A | * | 7/1992 | Ward et al. | 123/598 |
| 5,150,032 A | * | 9/1992 | Ho | 320/14 |

* cited by examiner

*Primary Examiner*—Adolf Deneke Berhane

(57) ABSTRACT

Transient current pulses/spikes generated by switching components of a battery plant are restricted from application to a floating battery, by suppressing circuitry which is connected to the battery terminals but mostly located outside of the main power path train, coupling primary power to the switching circuit. This blocks from the battery transient current pulses/spikes which may over charge the battery during the float charging operation and damage the battery.

9 Claims, 2 Drawing Sheets

CONVENTIONAL FILTERING FOR REDUCING
BATTERY CURRENT SPIKES

SATURABLE CHOKE FOR REDUCING
BATTERY CURRENT SPIKES

TRANSIENT CURRENT SUPPRESSION CIRCUITRY FOR REDUCING NOISE OF BATTERY FLOATING ACROSS INPUT OF VOLTAGE POLARITY SWITCH

This application is a continuation of application Ser. No. 08/572,941, filed on Dec. 15, 1995 now abandoned.

FIELD OF THE INVENTION

This invention relates to battery plants and to a battery floated across the input to a voltage/battery polarity switch (BPS) or other noisy load, for supplying reserve energy to back up rectified AC energy. It is particularly concerned with blocking current pulses/spikes at the battery terminals, during float charging, due to switching of power switches of the voltage polarity switch.

BACKGROUND OF THE INVENTION

A backup battery which is floated across the input of a voltage/battery polarity switch, such as shown in FIG. 1, is subject to large pulses or spikes of current during switching transitions of power switches of the voltage/battery polarity switch (BPS). This is because the load is disconnected and reconnected during each polarity transition, by the rectifying diodes of the load connecting the polarity switches to the load, being back biased during the transitions. These current spikes occur during float charging of the battery and can degrade battery performance and reduce battery life span. In fact any noisy load producing current spikes may have a deleterious effect on the battery.

In one prior art embodiment, having a battery floating across the power rails, as shown in FIG. 2, a capacitor is connected in parallel with the battery terminals in combination with a choke inductance included in one of the rails of the main power path train.

SUMMARY OF THE INVENTION

Transient current pulses/spikes generated by switching components of a battery plant are restricted from application to a floating battery, by blocking circuitry which is connected to the battery terminals but mostly located outside of the main power path train, coupling primary power to the switching circuit. This blocks transient current pulses/spikes which may over charge the battery during the float charging operation and damage the battery.

In one exemplary embodiment a saturable choke is connected in series with the battery terminals but outside of the the power flow path/rails from the input rectifier to the voltage polarity switch input. Its electrical characteristics are selected to block the current pulses/spikes generated when the battery is floating and hence is vulnerable to long term degradation due to the overcharge created by current spikes.

DETAILED DESCRIPTION

Figure 1:
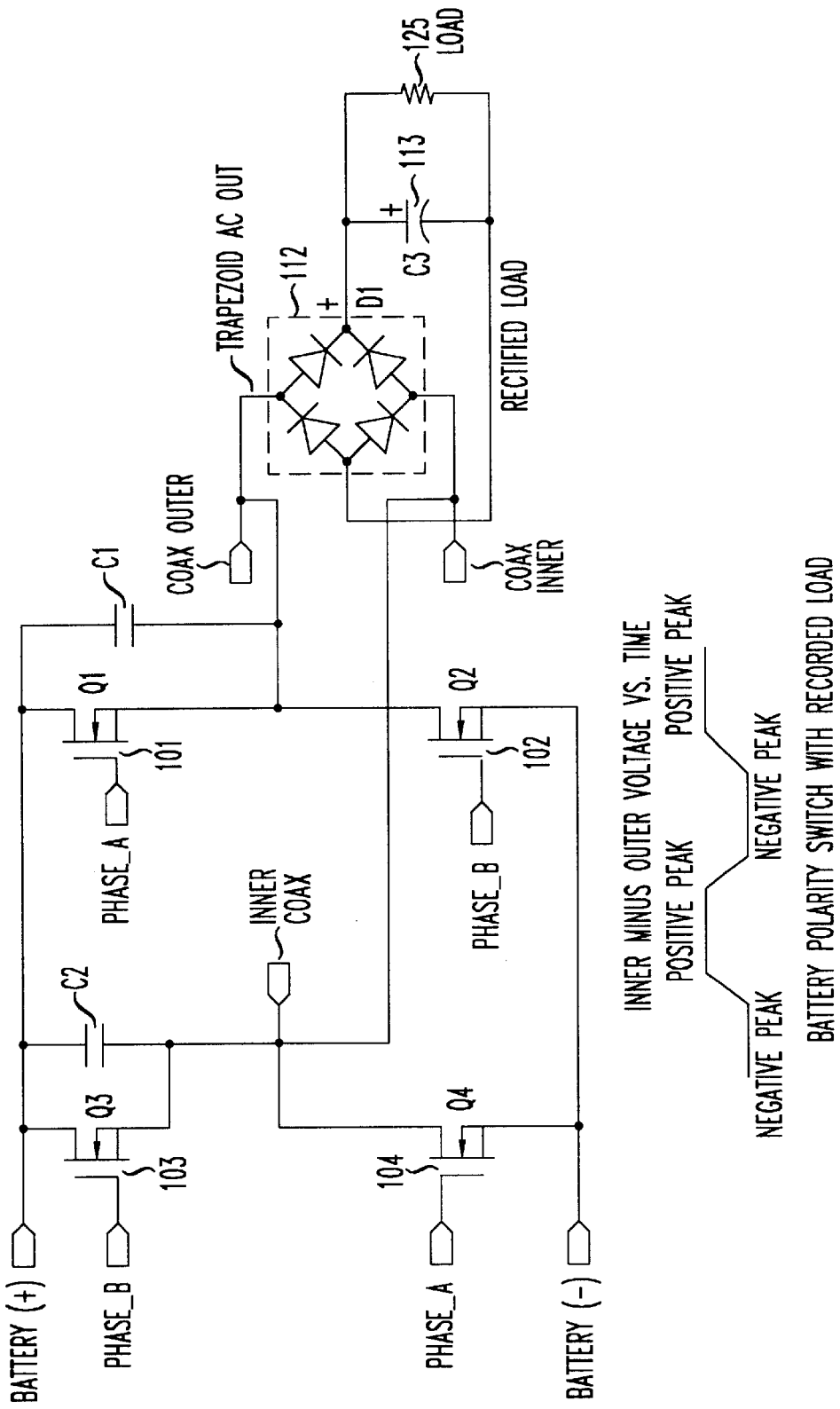
FIG. 1 is a schematic of a prior art voltage/battery polarity switch (BPS) providing power to a rectified load.

An unregulated Battery polarity Switch with a rectified load is shown in FIG. 1. An unregulated Battery Polarity Switch is shown for simplicity; however the Battery Polarity Switch could be a regulated type. The switches are shown in the figure as MOSFETs but could also be bipolar transistors. The output is described herein below as going to a coaxial cable, with the output tied to the "coax inner" terminal and the output return connected to the "coax outer" terminal. Other load connection arrangements may also be used.

The power train consists of four switches connected in an H bridge off the battery, with the switches in opposite legs of the bridge being turned on and off every BPS cycle to deliver an alternating trapezoidal voltage waveform to the output coaxial cable.

The BPS cycle is split into two phases, each having a duration of substantially 50% of the BPS cycle. During Phase A: the switch 101 is turned on pulling terminal coax outer to a (+) battery voltage and switch 104 is turned on pulling terminal coax inner to a (−) battery voltage. During Phase B: The switch 102 is turned on pulling the terminal coax outer to a (−) battery voltage and switch 103 is turned on pulling the terminal coax inner to a (+) battery voltage.

The transitions between the two phases A and B must be accomplished in a controlled time period to limit electrical noise at the load. A controlled transition is provided by controlling the slew rate of the inner coax and outer coax voltages. The resultant output voltage waveform is a trapezoid, switching between a positive output and a negative output. The load bridge rectifier 112 rectifies this waveform, and provides DC power to the capacitively bypassed load 125. The large load capacitance 113 maintains the load voltage at close to the trapezoid peak voltage out of the BPS, even through BPS transitions.

This voltage across capacitor 113, keeps the diodes in rectifier 112 back biased, during most of the polarity switch output transition time. Hence, the diodes in rectifier 112 are back biased and no current flows out of the polarity switch. It is these load current interruptions occurring during polarity transitions, that translate into current spikes fed into the Battery Polarity Switch, and in turn to the Battery which is in the supply power path to the Battery Polarity Switch.

Figure 2:
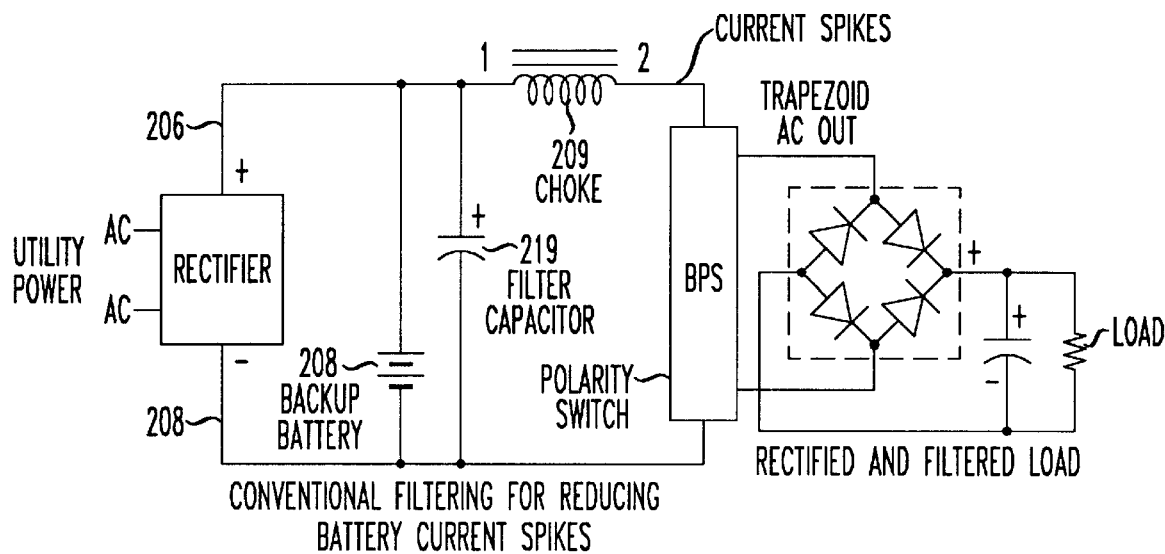
FIG. 2, is a schematic of a prior art power system supplying rectified power to a voltage/battery polarity switch (BPS); and with circuitry to protect the floating battery from current pulses/spikes.

In an illustrative arrangement, providing protection against these current spikes shown in the FIG. 2, the choke/inductor 209 is placed in the rail 206 and a filter capacitor 219 is placed in parallel with terminals of the battery 208. The inductor 209 is substantially large, and hence impedes flow of the noise in rail 206 which carries the full load current at all times. To work, this inductor must maintain its inductance at the full load current, and consequently, must be quite large. Capacitor 219 filters any noise that gets through inductor 209.

Figure 3:
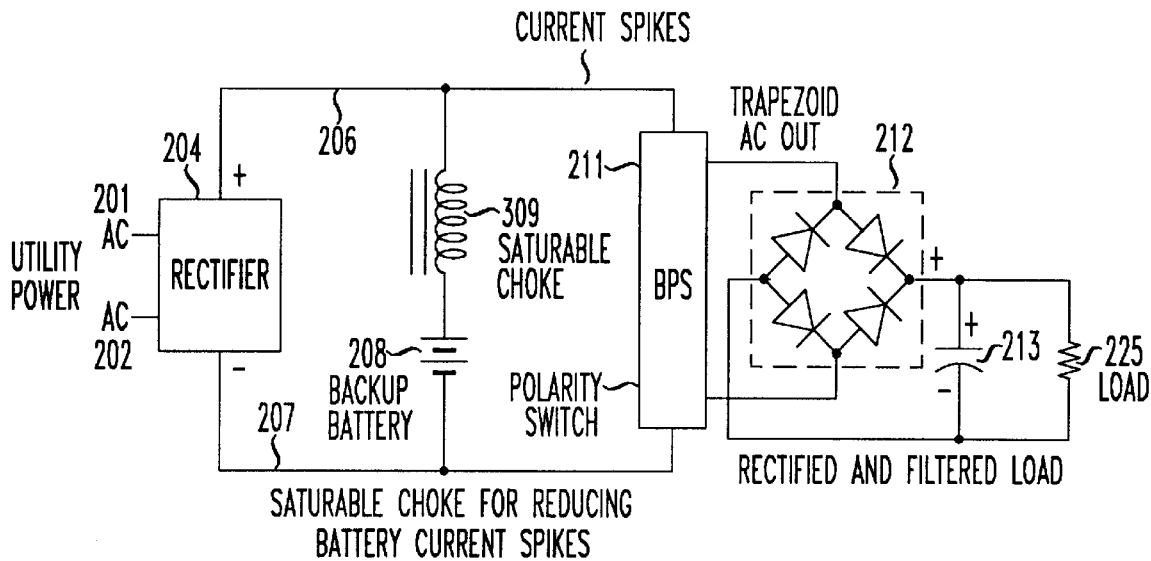
FIG. 3 is a schematic of a power system supplying rectified power to a voltage polarity switch and with a battery floated across the power path rails and protected from current pulses/spikes according to the principles of the invention.

A battery plant incorporating the invention is shown in the FIG. 3. AC voltage is applied to the input terminals 201 and 202 which in turn applies the AC voltage to a rectifier 204. The rectifier output is applied to the two rails 206 and 207 which applies the rectified voltage to the voltage/battery polarity switch (BPS) 211. The output of the BPS 211 is a bipolar trapezoidal voltage waveform which is rectified by rectifier 212 and applied to a load 225. A filter capacitor capacitor 213 shunts the load 225.

A battery 208 is connected in series with a saturable choke 309, the series circuit of which is connected across the rails 206 and 207. With the battery and choke connection, the noise blocking choke is advantageously maintained outside of the main power path comprising the rails 206 and 207. The choke 309 is designed to saturate at fairly light currents which permits the use of a fairly small sized choke and yet blocks the transient pulses that cause over charging. In the exemplary embodiment the choke has an iron core which saturates at 2% of the full load current of the plant. It is apparent that this permits a physically small choke, since the core saturates at such a low current.

In operation of the plant, the BPS 211 is normally powered by the output of the rectifier 204. The battery connected across the rails 206 and 207 receives a small float charging current (e.g., about 1% of the load current). The switching action of the BPS 211 causes the current pulses/spikes that can degrade the battery over the long term. This is especially true if the battery is fully charged since the current pulses overcharge the battery and cause internal damage to the battery.

In the event of a failure of the AC line voltage, the battery supplies the power to the BPS 211. During this mode of operation large currents are carried by the battery 208 and the now saturated choke 309. Large currents are also generated during the recharging of the battery following an AC line failure and subsequent restoration of AC line voltage. These currents can readily flow through the choke 309 because it is now saturated. Large currents are not damaging in these operative modes since the battery is discharging or is discharged.

Since the saturating choke 309 only needs to suppress current pulse/spikes during float charging, the inductance of the choke is high at light charging currents, and the choke is saturated when the battery is charging or discharging. In the illustrative example the choke 309 is designed to saturate at 2% of the full load current, and is designed to accommodate the full load current when saturated during a failure of the primary AC line voltage. Its inductance is maintained linear at only the battery float current level. By saturating at only 2% of full load, its size is reduced by a factor or 50.

The invention claimed is:

1. For use in a battery plant having a main power path in which an input rectifier is coupled to a load and a secondary power path across rails of the main power path and including a reserve battery, a suppression circuit, comprising:
   a saturable inductor, coupled in series with the reserve battery in the secondary power path, that saturates at significantly less than full load current of the battery plant and diverts a portion of transient pulses from the reserve battery.

2. The suppression circuit as recited in claim 1 wherein the load comprises a voltage polarity switching circuit.

3. The suppression circuit as recited in claim 1 wherein the load comprises a noisy current pulse inducing load.

4. The suppression circuit as recited in claim 1 wherein the saturable inductor saturates at 2% of full load current of the battery plant.

5. A battery plant, comprising:
   an input rectifier for rectifying an alternating current from an input source of electrical power and in a main power path between the input rectifier and a load;
   a reserve battery in a secondary power path floated across rails of the main power path; and
   a saturable inductor, coupled in series with the reserve battery in the secondary power path, that saturates at significantly less than full load current of the battery plant and diverts a portion of transient pulses from the reserve battery.

6. The battery plant as recited in claim 5 wherein the load comprises an output rectifier and an output filter.

7. The battery plant as recited in claim 5 wherein the load comprises a voltage polarity switching circuit.

8. The battery plant as recited in claim 5 wherein the load comprises a noisy current pulse inducing load.

9. The battery plant as recited in claim 5 wherein the saturable inductor saturates at 2% of full load current of the battery plant.

* * * * *